United States Patent Office 2,739,134
Patented Mar. 20, 1956

2,739,134

FOAM-FORMING COMPOSITION CONTAINING GLYCIDYL POLYETHER OF A DIHYDRIC PHENOL

Harvey L. Parry and Billee O. Blackburn, Berkeley, Calif., assignors to Shell Development Company, Emeryville, Calif., a corporation of Delaware No Drawing. Application August 24, 1951,
Serial No. 243,585

4 Claims. (Cl. 260—2.5)

This invention relates to a composition containing a resin-forming glycidyl polyether and a blowing agent, and to a method of forming a resinous foam from the composition.

Radomes are bulging exterior structure portions in the fuselage of military airplanes which contain radar equipment. They are substantially hemispherical in shape, and in the past have been constructed in a complicated manner which used a great deal of time and manpower. A plastic sheet or laminate was first formed into an inner skin for the radome and then a number of honeycomb plastic sheets were laid up by hand with suitable cementing to the required thickness of an inch or more, after which another larger plastic sheet or laminate was placed over and cemented to the laid up structure so as to form the outer skin. This time-consuming and expensive procedure in manufacturing radomes is avoided by use of the composition of the present invention.

The two plastic skins are placed and held in the desired relation to each other, and the composition of the present invention in fluid condition is rapidly mixed with a hardening agent for the resin-forming glycidyl polyether. This fluid mixture is then poured into the space between the skins. The mixture behaves in a unique and useful manner. The hardening agent causes curing reactions to start and these result in development of considerable exothermic heat which raises the temperature of the mixture. The raised temperature decomposes the blowing agent so that small gas cells are formed throughout, and the mixture as a whole expands greatly so as to fill the space between the plastic skins. While in this expanded condition, the resinous foam cures to a hard product of high strength.

Owing to the unique property of developing exothermic heat in situ, the necessity and inherent difficulty of applying heat from an external source is obviated. The foamed mixture cures itself. Moreover, the cured foam is bonded very tenaciously to the plastic skins so the radome is exceptionally strong and, possibly most important, the transmission characteristics of ultra high frequency radio waves of radar through the foamed structure are extremely good.

In brief, the composition of the invention is a glycidyl polyether of a dihydric phenol having mixed therewith a blowing agent. The blowing agent is a liquid to solid chemical compound at 20° C. and one atmosphere pressure (760 mm. Hg) which undergoes thermal decomposition at about 50° C. to 200° C. to yield a decomposition product which is a gas at S. T. P. (standard temperature and pressure, i. e., 0° C. and one atmosphere pressure). Upon decomposing at the decomposition temperature within the range of about 50° C. to 200° C., the blowing agent forms at least one mol of the gas per mol of blowing agent. This gaseous decomposition product is at least one gas of the group consisting of nitrogen, carbon dioxide, carbon monoxide, and nitric oxide.

A considerable variety of compounds are employed as blowing agent in the composition including ammonium carbonate, ammonium bicarbonate, sodium bicarbonate, potassium bicarbonate, diazoaminobenzene, diazoaminotoluene, 1,3 - bis(o-xenyl)-triazine, 1,3-bis(p-xenyl)-triazine, p,p'-oxy-bis(benzenesulfonyl hydrazide), diazodiisobutyronitrile, dinitroso pentamethylene tetramine, diphenyl-4,4'-di(sulfonyl azide), cinnamoyl azide, furoyl azide and other thermally unstable compounds known in the art of blowing agents. The compound, p,p'-oxy-bis(benzenesulfonyl hydrazide), described in U. S. 2,552,065, has been found to be a particularly suitable blowing agent.

The glycidyl polyether of a dihydric phenol employed as resin-forming constituent in the composition of the invention is obtainable by reacting epichlorhydrin with a dihydric phenol in alkaline medium. The polyethers are produced by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

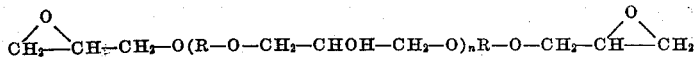

wherein $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol. It contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms with the two terminal groups, on the whole, being glycidyl groups.

The glycidyl polyethers of a dihydric phenol used in the invention have a 1,2-epoxy equivalency greater than 1.0. By the epoxy equivalency reference is made to the average number of 1,2-epoxy groups

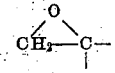

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2. However, in all cases it is a value greater than 1.0. The 1,2-epoxy equivalency of the polyethers is thus a value betwen 1.0 and 2.0.

The 1,2-epoxide value of the glycidyl polyether is determined by heating a weighed sample of the ether with an excess of 0.2 N pyridinium chloride in cholorform solution at the boiling point under reflux for 2 hours whereby the pyridinium chloride hydrochlorinates the epoxy groups to the chlorhydrin groups. After cooling, the excess pyridinium chloride is back-titrated with 0.1N sodium hydroxide in methanol to the phenolphthalein end point. This method is used for obtaining all epoxide values discussed herein.

Any of the various dihydric phenols are used in preparing the polyethers including mononuclear phenols such as resorcinol, catechol, hydroquinone, methyl resorcinol, etc.; or polynuclear phenols like 2,2-bis(4-hydroxyphenyl)propane which is termed bis-phenol herein for convenience, 4,4'-dihydroxybenzophenone, bis(4-hydroxyphenyl)methane, 1,1-bis(4-hydroxyphenyl)ethane, 1,1-bis(4-hydroxyphenyl)isobutane, 2,2-bis(4-hydroxyphenyl)butane, 2,2-bis(4-hydroxy-2-methylphenyl)-propane, 2,2-bis(4-hydroxy-2-tertiary-butylphenyl)-propane, 2,2-bis(2-hydroxynaphthyl)pentane, 1,5-dihydroxynaphthalene, etc.

Preferred polyethers are prepared from 2,2-bis(4-hydroxyphenyl)propane. They contain a chain of alternating glyceryl and 2,2-bis(4-phenylene)propane radicals separated by intervening ethereal oxygen atoms. Very suitable polyethers of this subclass have a 1,2-epoxy equivalency between about 1.6 and 1.9, a molecular weight of about 340 to 750, and an epoxide equivalent weight of about 180 to 330. More generally, it is preferred to employ glycidyl polyether of a dihydric phenol which has a value for $n$ in the above-mentioned structural formula of about 0 to 2.

The glycidyl polyethers will be more fully understood from consideration of the following described preparations and the properties of the products.

POLYETHER A

Glycidyl polyethers of a dihydric phenol having lowest molecular weight, i. e., $n$ approaching or equaling zero, are best prepared by reacting the dihydric phenol and base with epichlorhydrin in the presence of a large excess of epichlorhydrin such as at least 5 mols of epichlorhydrin per mol of the phenol.

Bis-phenol is dissolved in epichlorhydrin in the proportion of 5,130 parts (22.5 mols) of bis-phenol in 20,812 parts (225 mols) of epichlohydrin and 104 parts of water. The solution is prepared in a kettle provided with heating and cooling equipment, agitator, distillation condenser and receiver. A total of 1,880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to cool the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durran's mercury method softening point of 9° C., an average molecular weight of 370 by ebullioscopic measurement in ethylene dichloride, and an epoxide value of 0.50 epoxy equivalents per 100 grams. It has an epoxide equivalent weight of 200 and a 1,2-epoxy equivalency of 1.85. The product is designated herein as polyether A.

POLYETHER B

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous, semi-solid having a softening point of 27° C. by Durran's mercury method, an epoxide equivalent weight of 245 and a molecular weight of 460. The 1,2-epoxy equivalency was 1.88. This product will be referred to hereinafter as polyether B.

POLYETHER C

Polyethers of higher molecular weight are prepared by using smaller ratios of epichlorhydrin to bis-phenol. In a vessel fitted with an agitator, 228 parts (1 mol) of bis-phenol and 86 parts (2.14 mols) sodium hydroxide as a 10% aqueous solution are introduced and heated to about 45° C. whereupon 189 parts (2.04 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 43° C. The measured molecular weight of the product is 620 and it has an epoxide value of 0.29 epoxy equivalents per 100 grams. The epoxide equivalent weight is 345 and the 1,2-epoxy equivalency is 1.8. It will be identified hereinafter as polyether C.

POLYETHER D

Another polyether of still higher molecular weight is prepared as described for polyether C except that for each mol of bis-phenol there is used 1.57 mols of epichlorhydrin and 1.88 mols of sodium hydroxide. The obtained polyether has a softening point of 69° C. by Durran's mercury method, a molecular weight of 850, and an epoxide value of 0.20 epoxy equivalents per 100 grams. The epoxide equivalent weight is 500, and the 1,2-epoxy equivalency is 1.7.

POLYETHER E

This glycidyl polyether is prepared in like manner to that of polyether C except that for each mol of bis-phenol there is employed 1.22 mols of epichlorhydrin and 1.37 mols of sodium hydroxide. The resulting polyether has a softening point of 98° C. by Durran's mercury method, a molecular weight of 1400 as measured ebullioscopically in ethylene dichloride, and an epoxide value of 0.12 epoxy equivalents per 100 grams. The epoxide equivalent weight is 920, and the 1,2-epoxy equivalency is 1.68.

The composition of the invention is prepared by mixing the glycidyl polyether of a dihydric phenol that has a 1,2-epoxy equivalency of between 1.0 and 2.0 with about an added 0.2% to 30% by weight of blowing agent. Depending upon the character of the particular blowing agent employed, the blowing agent may or may not dissolve in the polyether. In order to make possible the obtainment of cured resinous foam with the most uniform cellular structure, it is desirable that the blowing agent be distributed uniformly in the polyether. This condition is readily accomplished with soluble blowing agents. In the case of the polyether-insoluble blowing agents, e. g., ammonium carbonate, the blowing agent is added in finely divided or powdered form and uniformly mixed into the polyether.

The composition contains about an added 0.2% to 30% by weight, based upon the weight of the polyether therein, of blowing agent. Ordinarily, about an added 0.5% to 5%, preferably about 2%, by weight is used. Although the extent of expansion of the foam will in general be correlated with the proportion of the blowing agent contained in the initial composition, the degree of expansion will also be influenced by several other factors. The particular blowing agent is one factor since some yield only one gaseous decomposition product and others yield several. Another factor is the maximum temperature reached by the expanding mixture. Still another is the degree of fluidity of the expanding mixture which is controlled primarily by the particular polyether contained as major constituent of the composition, but is also influenced to some extent by such other constituents as fluidizing solvents and the like contained therein. Thus although the composition may contain any glycidyl polyether of a dihydric phenol having a 1,2-epoxy equivalency between 1.0 and 2.0, it is preferred to use polyethers having a viscosity of about 50 to 300 centipoises at 100° C., as is the case with polyethers A, B and C described hereinbefore. Particularly preferred polyethers have a viscosity of about 90 to 160 centipoises at 100° C., of which polyether B is typical.

As noted above, the composition may also contain a fluidizing solvent for the glycidyl polyether. For this purpose, there is used one or more liquid solvents which boils above about 50° C. at 760 mm. pressure, such as acetone, methyl ethyl ketone, isophorone, toluene, xylene, ethyl acetate, butyl acetate, chloroform, trichloropropane, and the like. The liquid solvent is used in such amount that the composition has a viscosity of about 15 to 500 centipoises at 100° C. Thus in compositions contained preferred polyethers having a viscosity of about 50 to 300 centipoises at 100° C., it is often desirable to have present about an added 3% to 10% of toluene or other normally liquid solvent for the polyether.

Another useful, but optional, component included in the composition is a surface-active agent which decreases its surface tension and thereby promotes increased expansion, smaller cells, and more uniform texture of the expanded product from the composition. Very suitable for this purpose are the polyalkylene glycol ethers of sorbitan mono-esters of long chain fatty acids, such as lauric, stearic and oleic acid. Excellent results are obtained with polyethylene glycol ether of sorbitan monolaurate (Tween 20). The surface-active agent is used in amounts of about an added 0.02% to 1% by weight of the polyether contained in the composition.

Still another useful constituent which may be included in the composition is a glycidyl polyether of a polyhydric alcohol having a 1,2-epoxy equivalency greater than 1.0. Such polyethers may be included in various amounts such as up to an equal amount with the dihydric phenol polyether. Preferably the polyhydric alcohol polyether has a viscosity of less than about 300 centipoises at 25° C.

Representative glycidyl polyethers of polyhydric alcohols include the diglycidyl ethers of ethylene glycol, propylene glycol, trimethylene glycol, diethylene glycol, triethylene glycol, glycerol, dipropylene glycol, and the like. Other typical ethers contain more than two glycidyl groups and include glycidyl polyethers of glycerol, diglycerol, erythritol, pentaglycerol, mannitol, sorbitol, polyallyl alcohol, polyvinyl alcohol, and the like. The glycidyl polyethers of the polyhydric alcohols are prepared by reacting the poyhydric alcohol with epichlorhydrin in the presence of about 0.1 to 2% of an acid-acting catalyst such as boron trifluoride, hydrofluoric acid or stannic chloride, whereby the chlorhydrin ether is formed as product. The reaction is effected at about 50 to 125° C. with the proportions of reactants preferably being such that there is about 1 mol of epichlorhydrin for each molecular equivalent of hydroxyl group in the polyhydric alcohol. Thus, in preparing the ether of glycerol, which polyhydric alcohol contains three hydroxyl groups in each mol thereof, about three mols of epichlorhydrin for each mol of glycerol are used. The resulting chlorhydrin polyether from the reaction of a polyhydric alcohol with epichlorhydrin is then dehydrochlorinated by heating at about 50 to 125° C. with a small, say 10% stoichiometrical excess of a base. For this purpose, sodium aluminate gives good results.

Preparation of glycidyl polyethers of polyhydric alcohols may be illustrated by considering preparation of glycidyl polyether of glycerol.

POLYETHER F

About 276 parts of glycerol (3 mols) were mixed with 828 parts of epichlorhydrin (9 mols). To this reaction mixture were added 10 parts of a diethyl ether solution containing about 4.5% of boron trifluoride. The temperature rose as a result of the exothermic reaction and external cooling with ice water was applied so as to keep the temperature between about 50° C. and 75° C. during a reaction period of about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 205° C. at 20 mm. pressure. The polyglycidyl ether, in amount of 261 parts, was a pale pellow liquid having a viscosity of about 170 centipoises at 25° C. It had an epoxide value of 0.671 equivalents per 100 grams and the molecular weight was 324 as measured ebullioscopically in a dioxane solution. These values showed that the polyglycidyl ether had a 1,2-epoxy equivalency of 2.18, i. e., an average of about 2.2 epoxide groups per molecule.

The composition of the invention may also include such other conventional ingredients as plasticizers, pigments, dyes, fillers, lubricants, etc.

In using the foam-forming composition of the invention, it is commingled with an amino hardening agent for the glycidyl polyether of a dihydric phenol, which hardening agent contains at least one amino nitrogen atom having at least one hydrogen atom linked directly thereto. Various amines may be used such as ethylene diamine, diethylene triamine, triethylene tetramine, diacetone diamine, hexamethylene diamine, diethylamine, dibutylamine, n-butylamine, benzylmethylamine, etc. In general, the amine is free of other elements than carbon, hydrogen, and nitrogen. Preferably the hardening agent contains at least one primary amino group and this is linked to an aliphatic (non-aromatic) carbon atom.

The curing reactions which occur upon mixing the hardening agent with the composition containing the glycidyl polyether of a dihydric phenol result in development of exothermic heat which raises the temperature of the mixture. This development of heat and consequent temperature rise is very useful. By choice of proper conditions, the hardening agent can be added to and mixed with the composition of the invention so that the temperature rises above the decomposition temperature of the blowing agent with the result that the blowing agent decomposes so as to expand the mixture. While in this expanded and heated condition, the glycidyl polyether gels and cures to the desired hard resin. Thus the process of the invention is effected by commingling the amino hardening agent with the composition containing the glycidyl polyether and a blowing agent, the commingling being effected with the initial temperature of the reaction mixture at the time of commingling at a temperature below the decomposition temperature of the blowing agent, but at a temperature sufficiently high that the exothermic heat of the curing reactions raises the temperature of the reaction mixture above the decomposition temperature of the blowing agent. The reaction mixture is then allowed to expand by action of the gaseous decomposition product from the decomposing blowing agent, and while in expanded condition, the mixture gels and cures to a hard resinous product.

The initial temperature employed in the process is governed by two factors, the decomposition temperature of the blowing agent and the increase in temperature developed by the curing reactions. An initial temperature as low as room temperature (about 20° C.) can be used with some blowing agents. Ammonium carbonate which decomposes at about 58° C. is suitable in this instance because the curing reactions with an amino curing agent such as diethylene triamine will increase the temperature considerably above the 38 degree interval between 20° C. and 58° C. In more general use of ammonium carbonate, initial temperatures of about 20° C. to 50° C. are suitable. In those cases where a blowing agent is employed which has a decomposition temperature materially higher, correspondingly higher initial temperatures are used. Thus with p,p'-oxy-bis(benzenesulfonyl hydrazide) which decomposes at about 135° C. to 140° C., an initial temperature of about 80° C. to 120° C. is very suitable.

The extent of temperature rise occurring from the exothermic curing reactions will vary with the size of the foam-forming mixture, the rapidity of cure of the particular hardening agent, and the amount of hardening agent added. In those cases where there is a rapid increase in temperature, it is desirable to include a substance in the composition which will vaporize and thereby consume at least part of the exothermic heat. This substance may be a liquid solvent for the glycidyl polyether as was described hereinbefore, e. g., toluene, or it may be water. As to particular hardening agents, the behavior of diethylene triamine is particularly preferred, especially when used in amounts of about 3% to 15% by weight based upon the weight of the polyether.

Although it is more customary to effect gelation of the expanded mixture with the mass not being heated from external sources, such external heating may be applied if desired. Excellent cure of the glycidyl polyether to a hard, solvent-resistant resin is obtained at a temperature of about 75° C. to 250° C.

The had resinous foam is a very useful product. It has high strength for resinous foams, has low heat conductivity, and has low density such as from about 4 to 20 pounds per cubic foot. Besides being useful in radome construction as explained hereinbefore, the cured resinous foam may be used as space-filling material in laminated structures between sheets of wood, plywood, resin-impregnated paper, sheet metal, asbestos board, plaster board, and the like. It is useful for thermal insulation of refrigerators, air-conditioning apparatus, etc., and is excellent in acoustical insulating applications.

The invention is illustrated by the following examples, but it is to be understood that the invention is not to be construed as limited by details described therein.

*Example 1*

A stock solution was made by adding 1 part by weight of powdered ammonium carbonate to 9 parts of polyether B. In paper cups, there was then placed 1 gram of the stock solution and 19 grams of additional polyether B were mixed therewith so that the composition contained about 1% ammonium carbonate as blowing agent.

Three cups were prepared containing the composition, and at a temperature of about 45° C., there was added diethylene triamine as curing agent in the amounts listed in the table below. After mixing in the curing agent, the cups were placed in an air oven set at the temperature given in the table. The compositions foamed and cured to hard products having a cellular structure of small diameter.

| Added Percent Curing Agent | Oven Temperature, ° C. | Density of Foam, Lbs./cu. ft. |
|---|---|---|
| 4 | 100 | 19.8 |
| 8 | 100 | 9.9 |
| 8 | 60 | 11.4 |

*Example 2*

A series of resin foams were prepared using different blowing agents. In each case, the blowing agent in the amount listed in the table below was placed in a paper container and two to three drops of polyethylene glycol ether of sorbitan monolaurate (Tween 20) were mixed therewith. One hundred grams of polyether B at a temperature of about 100° C. were added next and mixed with the first ingredients. Immediately thereafter while the composition was still at about 100° C., 5 grams of diethylene triamine were rapidly mixed into the composition. With the paper container and mixture in the open atmosphere at room temperature of about 20° C., the mixture expanded and gelled in about one minute's time. A thermocouple was thrust into the center of the mass at the start and connected to appropriate apparatus for measuring temperature in order to determine the maximum temperature reached which occurred about two to three minutes after adding the curing agent to the composition. The expanded mass cooled in about 30 minutes' time, and there was obtained a creamy white stiff hard solid having great strength. The density was measured and is given in the following table. Trade names are also noted in footnotes to the table.

| Blowing Agent | Grams Blowing Agent | Maximum Temperature, ° C. | Density of Foam, Lbs./cu. ft. |
|---|---|---|---|
| p,p'-Oxy-bis(benzenesulfonyl hydrazide).ᵃ | 1 | 175 | 8.5 |
| Dinitroso pentamethylene tetramine ᵇ | 1 | 195 | 10.7 |
| Diazoaminobenzene ᶜ | 1 | 182 | 9.5 |
| Dinitroso pentamethylene tetramine ᵇ and water | 1 | 170 | 5.8 |
| Ammonium carbonate | 2 | | 7.5 |

ᵃ Naugatuck 709.
ᵇ Unicel ND; contains 40% blowing chemical and 60% inert filler.
ᶜ Unicel.

*Example 3*

In order to determine the effect of different proportions of blowing agent in the resin-forming compositions on the cured product, a series of compositions were prepared and cured. In each case, Naugatuck 709, p,p'- oxy-bis(benzenesulfonyl hydrazide), was employed as blowing agent. The compositions were prepared by making a slurry of the blowing agent in the amount tabulated below in 5 cc. of toluene and 3 drops of polyethylene glycol ether of sorbitan monolaurate. To the slurry were added and mixed 100 grams of hot polyether B. With the initial temperature of the compositions at about 105° C., there were mixed into each 5 grams of diethylene triamine. The mixture expanded and cured to give hard resinous foams of different densities which were determined and are listed in the following table:

| Grams Blowing Agent | Density of Foam, Lbs./cu. ft. |
|---|---|
| 0.25 | 15.6 |
| 0.5 | 10.0 |
| 1 | 7.3 |
| 4 | 5.8 |

*Example 4*

The effect of having present different proportions of inert liquid in the composition to fluidize the resin-forming polyether and to absorb part of the exothermic heat by vaporization was determined with a series of compositions. Each composition had 100 grams of hot polyether B added to a slurry of 2 grams of p,p'-oxy-bis(benzenesulfonyl hydrazide), in the amount of toluene tabulated below and 3 drops of polyethylene glycol ether of sorbitan monolaurate. With the initial temperature at about 93° C., there were then added 5 grams of diethylene triamine to each composition. The mixtures expanded and cured to hard resinous foams with different densities which are given in the following table.

| Toluene in cc. | Density of Foam, Lbs./cu. ft. |
|---|---|
| None | 17.5 |
| 1 | 15.0 |
| 5 | 7.1 |
| 10 | 4.7 |

*Example 5*

The effect of using different initial temperatures at the time the hardening agent is added to the foam-forming composition was studied in a series of runs. To a slurry of 2 grams of p,p'-oxy-bis(benzenesulfonyl hydrazide) in 5 cc. of toluene containing 2 drops of polyethylene glycol ether of sorbitan monolaurate, 100 grams of polyether B were mixed therewith in each case. With the starting temperature of the compositions as listed in the table below, there were mixed in 5 grams of diethylene triamine. The mixtures produced the resinous foams having the densities noted.

| Initial Temperature, ° C. | Density of Foam, Lbs./cu. ft. |
|---|---|
| 80 | 14.7 |
| 90 | 9.5 |
| 100 | 9.4 |
| 110 | 6.0 |
| 120 | 6.6 |
| 130 | 10.9 |
| 140 | 5.9 |

The results in the above table bring out several facts. A foam of greatest density was obtained with an initial temperature of 80° C. because the lowest resulting maximum temperature from exothermic reaction heat development is reached and consequently the resin-forming mixture is most viscous or resistant to bubble formation. Upon increasing the initial temperature to 110° C., a low point of density is reached. By increasing the initial temperature to 130° C., another intermediate maximum occurs owing to loss of toluene by boiling during the expansion and curing with some loss in fluidity of the curing mixture. The minimum density, i. e., greatest extent of expansion was reached with an initial temperature of 140° C. The decomposition temperature of the blowing agent employed was 135° C. to 140° C. with the result that appreciable gas formation occurred before the mixture began to gel and/or develop gas-enclosing strength.

*Example 6*

The use of room temperature or about 20° C. as initial temperature when the curing agent is added to a composition will be illustrated in this example. One hundred grams of polyether A were mixed with a slurry of 2 grams of ammonium carbonate in 5 cc. of toluene containing 3 drops of polyethylene glycol ether of sorbitan monolaurate. With the composition at about 20° C., 8 grams of diethylene triamine were added and mixed with the composition. After about 20 minutes, the mixture developed sufficient heat so that the blowing agent began to decompose and the mixture started to expand. The expansion continued for about an additional 5 minutes time so as to produce a cured resinous foam having a density of 6.7 pounds per cubic foot.

*Example 7*

Foams were prepared from another polyether in a series of compositions containing different proportions of polyether solvent. Each composition was prepared by mixing 100 grams of polyether C with a slurry of 2 grams of p,p'-oxy-bis(benzenesulfonyl hydrazide) and 3 drops of polyethylene glycol ether of sorbitan monolaurate in the amount of toluene tabulated below. With the compositions at a temperature of about 107° C., 5 grams of diethylene triamine were admixed therewith. The mixtures foamed and cured to products having the densities given in the following table.

| cc. Toluene | Density of Foam, Lbs./cu. ft. |
|---|---|
| 5 | 7.4 |
| 10 | 4.2 |
| 15 | 3.3 |

*Example 8*

Polyether D, in amount of 100 grams, was added to and mixed with a slurry of 2 grams of p,p'-oxy-bis(benzenesulfonyl hydrazide) and 3 drops of polyethylene glycol ether of sorbitan monolaurate in 10 cc. of toluene. With the composition at about 150° C., there was added with mixing 8 grams of diethylene triamine. The heat-developing reactions started fast and the mixture foamed and gelled in a very short time. A hard resinous foam was obtained that had a density of 6.6 pounds per cubic foot.

*Example 9*

A mobile liquid consisting of 25 grams of polyether E and 25 grams of polyether F was admixed with a slurry of 1 gram of p,p'-oxy-bis(benzenesulfonyl hydrazide) and 1 drop of polyethylene glycol ether of sorbitan monolaurate in 2.5 cc. of toluene. With the composition at 100° C., there was admixed therewith 2 grams of diethylene triamine. The cured hard resinous foam obtained as product had a density of 10.4 pounds per cubic foot.

We claim as our invention:

1. A process for producing a cured resinous foam which comprises the steps of commingling glycidyl polyether of a dihydric phenol having a 1,2-epoxy equivalency between 1.0 and 2.0 with about an added 0.2% to 30% by weight of a blowing agent of the group consisting of ammonium carbonate, ammonium bicarbonate, sodium bicarbonate, potassium bicarbonate, diazoaminobenzene, diazoaminotoluene, 1,3 - bis(o-xenyl)-triazine, 1,3 - bis(p-xenyl)-triazine, p,p'-oxy-bis(benzenesulfonyl hydrazide), diazodiisobutyronitrile, dinitroso pentamethylene tetraamine, diphenyl-4,4'-di(sulfonyl azide), cinnamoyl azide and furoyl azide, next heating the commingled mixture at a temperature below the decomposition temperature of the said blowing agent, and then mixing with said heated mixture while at said temperature of heating an amino curing agent for said polyether that contains at least one amino nitrogen atom having a hydrogen atom linked directly thereto whereby the mixture expands and cures in expanded condition to a resinous foam.

2. A process for producing a cured resinous foam which comprises the steps of commingling about an added 0.2 to 30% by weight of p,p'-oxy-bis(benzenesulfonyl hydrazide) with glycidyl polyether of a dihydric phenol having a 1,2-epoxy equivalency between 1.0 and 2.0 and a viscosity of about 50 to 300 centipoises at 100° C., then heating the commingled mixture to a temperature of about 80° C. to 120° C., next commingling an amino curing agent that contains at least one amino nitrogen atom having a hydrogen atom linked directly thereto with the mixture at said temperature whereby the exothermic heat of the curing reaction increases the temperature of the mixture to the decomposition temperature of the blowing agent, and allowing the mixture to expand and cure in expanded condition to a resinous foam.

3. A process for producing a cured resinous foam which comprises the steps of commingling about an added 0.2 to 30% by weight of p,p'-oxy-bis(benzenesulfonyl hydrazide) with glycidyl polyether of a dihydric phenol having a 1,2-epoxy equivalency between 1.0 and 2.0 and a viscosity of about 50 to 300 centipoises at 100° C., then heating the commingled mixture to a temperature of about 80° C. to 120° C., next commingling about 3 to 15% of diethylene triamine based upon the weight of said polyether with the mixture at said temperature whereby the exothermic heat of the curing reaction increases the temperature of the mixture to the decomposition temperature of the blowing agent, and allowing the mixture to expand and cure in expanded condition to a resinous foam.

4. A process for producing a cured resinous foam which comprises the steps of commingling together glycidyl polyether of 2,2-bis(4-hydroxyphenyl)propane having a 1,2-epoxy equivalency of about 1.6 to 1.9 and a viscosity of about 90 to 160 centipoises at 100° C. with about an added 0.5 to 5% by weight of p,p'-oxy-bis(benzenesulfonyl hydrazide), about an added 3 to 10% by weight of toluene, and about an added 0.02 to 1% by weight of polyethylene glycol ether of sorbitan monolaurate; then heating the commingled mixture to a temperature of about 80° C. to 120° C.; next commingling about 3 to 15% of diethylene triamine based upon the weight of said polyether whereby the exothermic heat of the curing reaction increases the temperature of the mixture to the decomposition temperature of the blowing agent; and allowing the mixture to expand and cure in expanded condition to a resinous foam.

References Cited in the file of this patent

UNITED STATES PATENTS

| | | |
|---|---|---|
| 2,446,429 | Nelson | Aug. 3, 1948 |
| 2,459,739 | Groten | Jan. 18, 1949 |
| 2,506,486 | Bender et al. | May 2, 1950 |
| 2,510,886 | Greenlea | June 6, 1950 |
| 2,552,065 | Schoene | May 8, 1951 |
| 2,623,023 | Koroly | Dec. 23, 1952 |

FOREIGN PATENTS

| | | |
|---|---|---|
| 616,315 | Great Britain | Jan. 19, 1949 |
| 123,074 | Australia | Nov. 4, 1948 |